United States Patent
Ryu et al.

(10) Patent No.: US 12,096,361 B2
(45) Date of Patent: Sep. 17, 2024

(54) SIGNAL MONITORING DURING DISCONTINUOUS RECEPTION

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Arumugam Chendamarai Kannan, San Diego, CA (US); Wooseok Nam, San Diego, CA (US); Yan Zhou, San Diego, CA (US); Juan Montojo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/302,997

(22) Filed: May 18, 2021

(65) Prior Publication Data
US 2022/0377668 A1 Nov. 24, 2022

(51) Int. Cl.
*H04W 52/02* (2009.01)
*H04W 24/08* (2009.01)
(Continued)

(52) U.S. Cl.
CPC ....... *H04W 52/0229* (2013.01); *H04W 24/08* (2013.01); *H04W 72/02* (2013.01);
(Continued)

(58) Field of Classification Search
None
See application file for complete search history.

(56) References Cited

U.S. PATENT DOCUMENTS

| 2020/0344722 A1* | 10/2020 | He | H04W 72/0446 |
| 2022/0224497 A1* | 7/2022 | Li | H04W 74/0808 |
| 2022/0304032 A1* | 9/2022 | Hahn | H04W 76/14 |

FOREIGN PATENT DOCUMENTS

| CN | 115443694 A * | 12/2022 | H04W 4/08 |
| EP | 3780891 A1 * | 2/2021 | H04W 4/06 |

(Continued)

OTHER PUBLICATIONS

International Search Report and Written Opinion—PCT/US2022/071750—ISA/EPO—Jul. 5, 2022.
(Continued)

*Primary Examiner* — Ayanah S George
(74) *Attorney, Agent, or Firm* — Harrity & Harrity, LLP

(57) ABSTRACT

Various aspects of the present disclosure generally relate to wireless communication. In some aspects, a user equipment (UE) may receive, from a transmit UE, a sidelink wake-up signal (WUS) that indicates the UE is to monitor a first subset of resources, of a set of resources, for sidelink control information (SCI) from the transmit UE, the set of resources being associated with an active monitoring state of a discontinuous reception (DRX) cycle. The UE may monitor the first subset of resources for the SCI. The UE may sense for signals associated with a sidelink control signal, the sidelink control signal being associated with at least one other UE, using a second subset of resources, of the set of resources. Numerous other aspects are described.

30 Claims, 7 Drawing Sheets

(51) Int. Cl.
    *H04W 72/02*     (2009.01)
    *H04W 72/20*     (2023.01)
    *H04W 76/28*     (2018.01)
    *H04W 92/18*     (2009.01)

(52) U.S. Cl.
    CPC ........... *H04W 72/20* (2023.01); *H04W 76/28* (2018.02); *H04W 92/18* (2013.01)

(56) References Cited

FOREIGN PATENT DOCUMENTS

| WO | WO-2019160788 A1 | * | 8/2019 | ............ H04W 72/10 |
|----|------------------|---|--------|-------------------------|
| WO | 2021029672 A1    |   | 2/2021 |                         |
| WO | WO-2022065950 A1 | * | 3/2022 | ............ H04W 72/25 |
| WO | WO-2022153548 A1 | * | 7/2022 | ............ H04L 1/1812 |

OTHER PUBLICATIONS

Samsung: "On Resource Allocation for Power Saving", 3GPP Draft, 3GPP TSG RAN WG1 Meeting #105-e, R1-2105334, 3rd Generation Partnership Project (3GPP), Mobile Competence Centre, 650, Route Des Lucioles, F-06921 Sophia-Antipolis Cedex, France, vol. RAN WG1, No. E-Meeting, May 10, 2021-May 27, 2021, May 12, 2021 (May 12, 2021), XP052011378, 8 Pages, Retrieved from the Internet: URL: https://ftp.3gpp.org/tsg_ran/WG1_RL1/TSGR1_105-e/Docs/R1-2105334.zip R1-2105334_PowerSaving.docx [Retrieved on May 12, 2021] Sections 1-4.

* cited by examiner

SIGNAL MONITORING DURING DISCONTINUOUS RECEPTION

FIELD OF THE DISCLOSURE

Aspects of the present disclosure generally relate to wireless communication and to techniques and apparatuses for signal monitoring during discontinuous reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving information that indicates the UE is to monitor a first subset of resources, of a set of resources, for sidelink control information (SCI) from a transmit UE, the set of resources being associated with an active monitoring state of a discontinuous reception (DRX) cycle; monitoring the first subset of resources for the SCI; and sensing, using a second subset of resources of the set of resources, for signals associated with sidelink control signals associated with at least one other UE.

In some aspects, a UE for wireless communication includes a memory; and one or more processors, coupled to the memory, configured to: receive information that indicates the UE is to monitor a first subset of resources, of a set of resources, for SCI from a transmit UE, the set of resources being associated with an active monitoring state of a DRX cycle; monitor the first subset of resources for the SCI; and sense, using a second subset of resources of the set of resources, for signals associated with sidelink control signals associated with at least one other UE.

In some aspects, a non-transitory computer-readable medium storing a set of instructions for wireless communication includes one or more instructions that, when executed by one or more processors of a UE, cause the UE to: receive information that indicates the UE is to monitor a first subset of resources, of a set of resources, for SCI from a transmit UE, the set of resources being associated with an active monitoring state of a DRX cycle; monitor the first subset of resources for the SCI; and sense, using a second subset of resources of the set of resources, for signals associated with sidelink control signals associated with at least one other UE.

In some aspects, an apparatus for wireless communication includes means for receiving information that indicates the UE is to monitor a first subset of resources, of a set of resources, for SCI from a transmit UE, the set of resources being associated with an active monitoring state of a DRX cycle; means for monitoring the first subset of resources for the SCI; and means for sensing, using a second subset of resources of the set of resources, for signals associated with sidelink control signals associated with at least one other UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
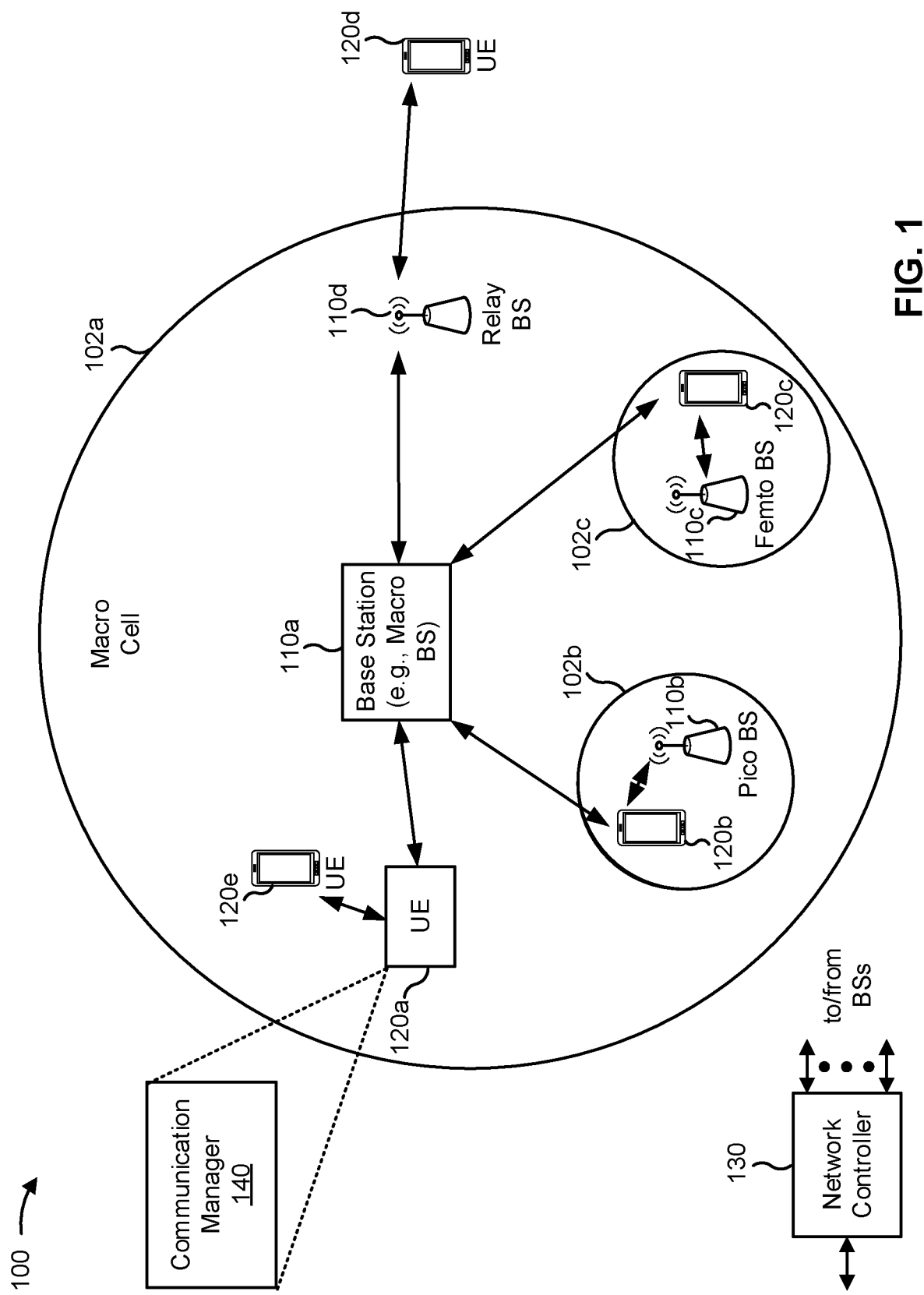
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a transmit UE, a sidelink wake-up signal (WUS) that indicates the UE is to monitor a first subset of resources, of a set of resources, for sidelink control information (SCI) from the transmit UE, the set of resources being associated with an active monitoring state of a discontinuous reception (DRX) cycle; monitor the first subset of resources for the SCI; and sense, using a second subset of resources of the set of resources, for sidelink control signals associated with at least one other UE. Additionally, or alternatively, the communication manager 140 may perform one or more other operations described herein.

As indicated above, FIG. 1 is provided as an example. Other examples may differ from what is described with regard to FIG. 1.

Figure 2:
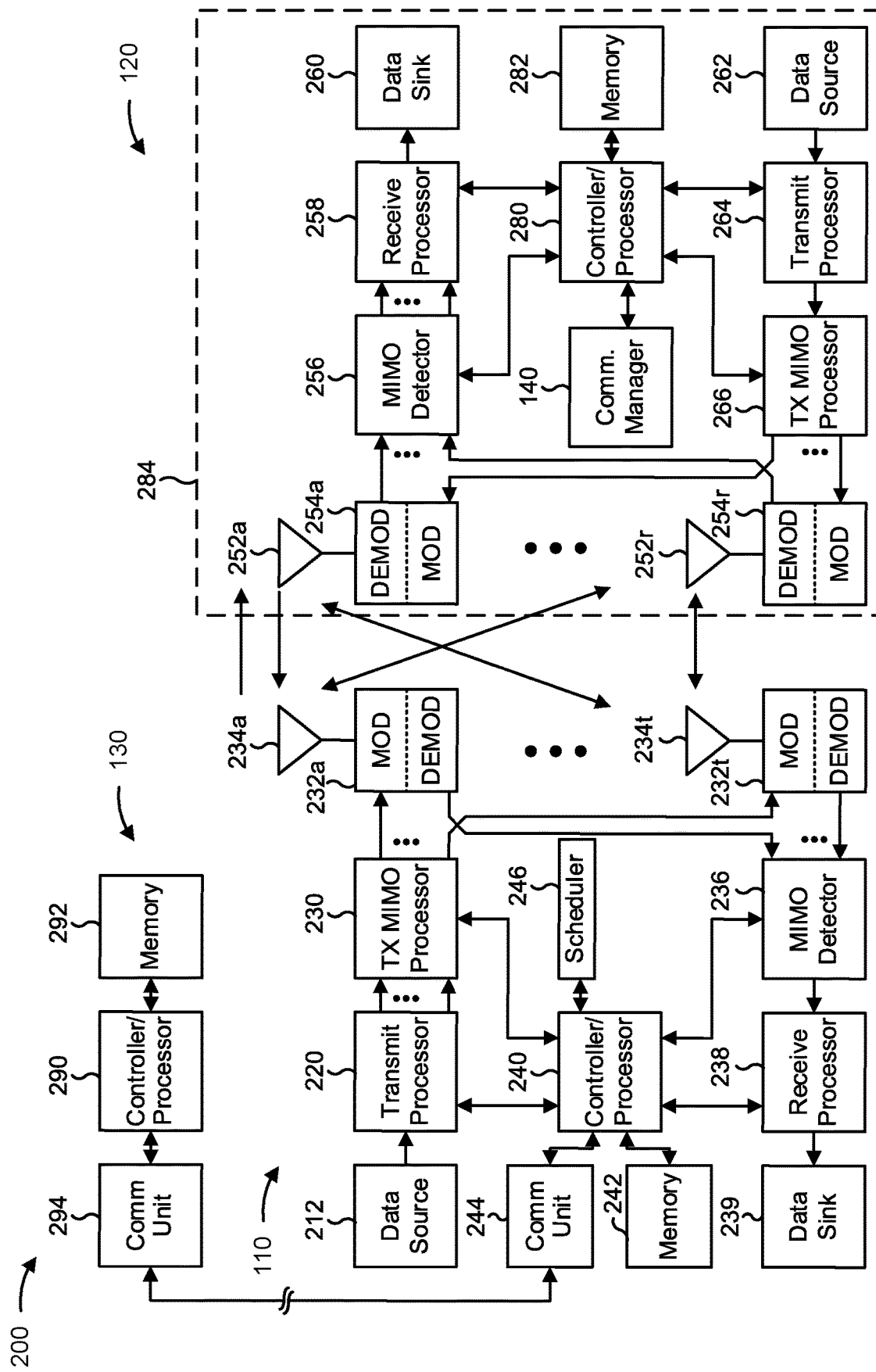
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5 and 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5 and 6.

Controller/processor 240 of base station 110, controller/processor 280 of UE 120, and/or any other component(s) of FIG. 2 may perform one or more techniques associated with signal monitoring during discontinuous reception, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving information that indicates the UE is to monitor a first subset of resources, of a set of resources, for SCI from a transmit UE, the set of resources being associated with an active monitoring state of a DRX cycle; means for monitoring the first subset of resources for the SCI; and/or means for sensing, using a second subset of resources of the set of resources, for signals associated with sidelink control signals associated with at least one other UE. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
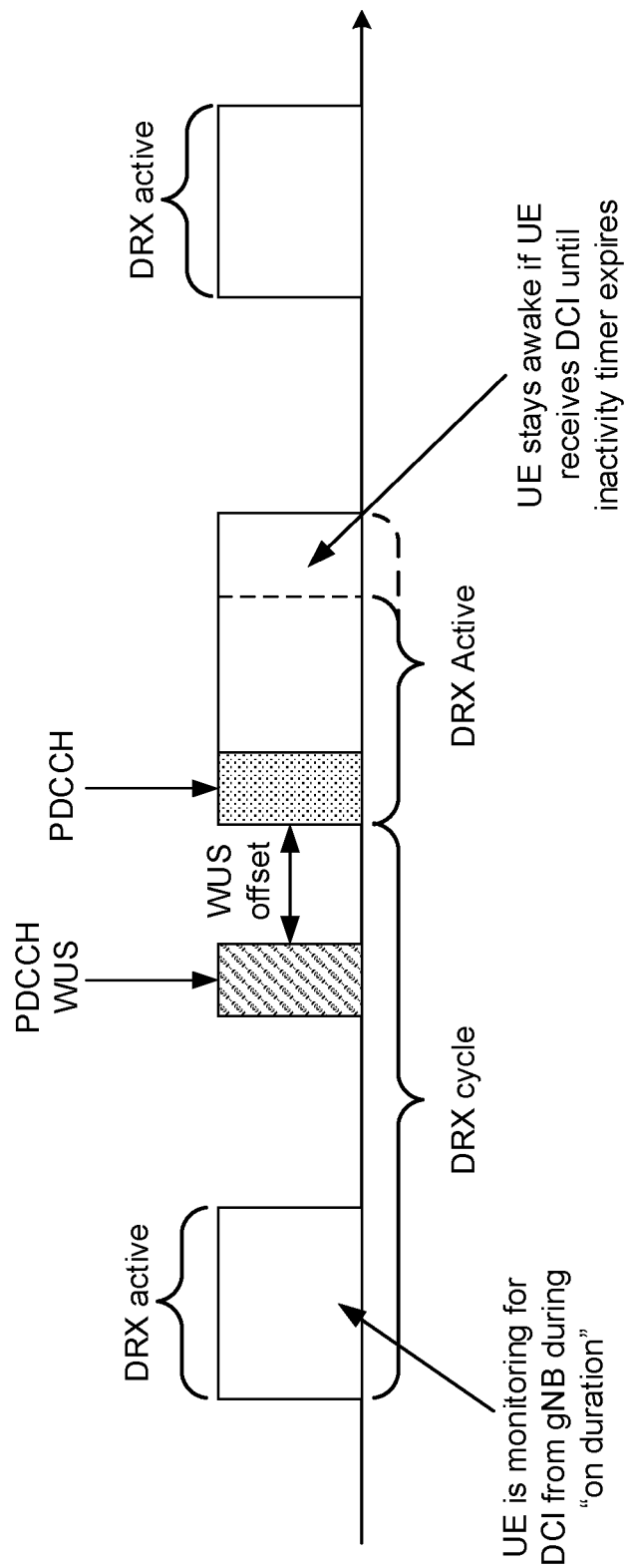
FIG. 3 is a diagram illustrating an example of discontinuous reception, in accordance with the present disclosure.

FIG. 3 is a diagram illustrating an example 300 of discontinuous reception (DRX), in accordance with the present disclosure.

As shown in FIG. 3, a UE may be configured to perform DRX in a manner designed to conserve battery life of the UE. For example, the UE may transition to a DRX inactive state (e.g., a sleep mode or off duration) for a DRX inactive duration. While in the DRX inactive state, the UE may refrain from transmitting or receiving on a link between the UE and another device (e.g., a base station, a sidelink UE, and/or the like), may deactivate particular subcarriers or component carriers (e.g., if carrier aggregation is implemented on the link) of the link, may deactivate one or more components of the UE, and/or the like. Moreover, DRX operation may include periodically transitioning out of the DRX inactive state and into a DRX active state (e.g., an awake mode or on duration) for a DRX active duration to monitor for downlink communications from a BS or sidelink communications from another UE. In some cases, the BS may transmit an instruction to the UE to configure DRX, to cause the UE to perform DRX in accordance with DRX parameters, to transition to a DRX inactive state, and/or the like.

As shown in example 300, when performing DRX, the UE may repeat DRX cycles. Each DRX cycle includes an active portion and an inactive portion. For the inactive portion of the DRX cycle, the UE may be in the DRX inactive state (e.g., conserving battery life), and for the active portion of the DRX cycle, the UE may be in the DRX active state (e.g., monitoring for communications). In some cases, the UE may be configured to use a WUS, such as a physical downlink communication channel (PDCCH) WUS or a sidelink WUS associated with a sidelink channel, to determine whether, for a given DRX cycle, the UE should switch from the DRX inactive state to the DRX active state. For example, a BS or another UE may transmit a WUS to the UE to provide an indication that the UE should switch to the DRX active mode (e.g., for reception of one or more other signals, such as PDCCH, during the DRX active mode). In some cases, if the UE is configured to use a WUS, and a WUS is not received during the DRX inactive state, the UE may not switch to a DRX active state. In this situation, the UE may only switch from the DRX inactive state to the DRX active state based at least in part on receiving a WUS during the DRX inactive state. When a PDCCH or SCI is received during a DRX active state, the UE may extend the DRX active state (e.g., until an inactivity timer expires) to extend the window during which the UE may receive signals. Using the WUS to trigger switching to the DRX active state may enable the UE to further conserve battery life by avoiding unnecessarily switching to the DRX active state.

As noted above, in some cases, a UE may be configured to communicate with another UE (or an integrated access and backhaul (IAB) node may be configured to communicate with another IAB node) over a sidelink, which may be referred to as sidelink communication. In some cases, sidelink communication between UEs might not be scheduled by a BS and may occur at any time. For example, one or more of the UEs may be operating outside of a coverage area of a serving BS or may not be communicatively connected with a serving BS, in which case the one or more UEs may autonomously (or semi-autonomously) schedule the transmission of sidelink communications on the sidelink. Autonomous or semi-autonomous scheduling of sidelink communications may be referred to as Mode 2 sidelink operation, and can be contrasted with Mode 1 sidelink operation, in which a central scheduler (such as a base station) handles scheduling of sidelink communications. In the case of Mode 2 sidelink operation, the BS may be unable to configure DRX operation for a UE, may be unable to instruct the UE to operate in a particular DRX state, and/or the like. However, another UE may be able to configure DRX operation for the UE, provide instructions for the UE to operate in a particular DRX state, and/or the like, via sidelink communication.

As indicated above, FIG. 3 is provided as an example. Other examples may differ from what is described with respect to FIG. 3.

Figure 4:
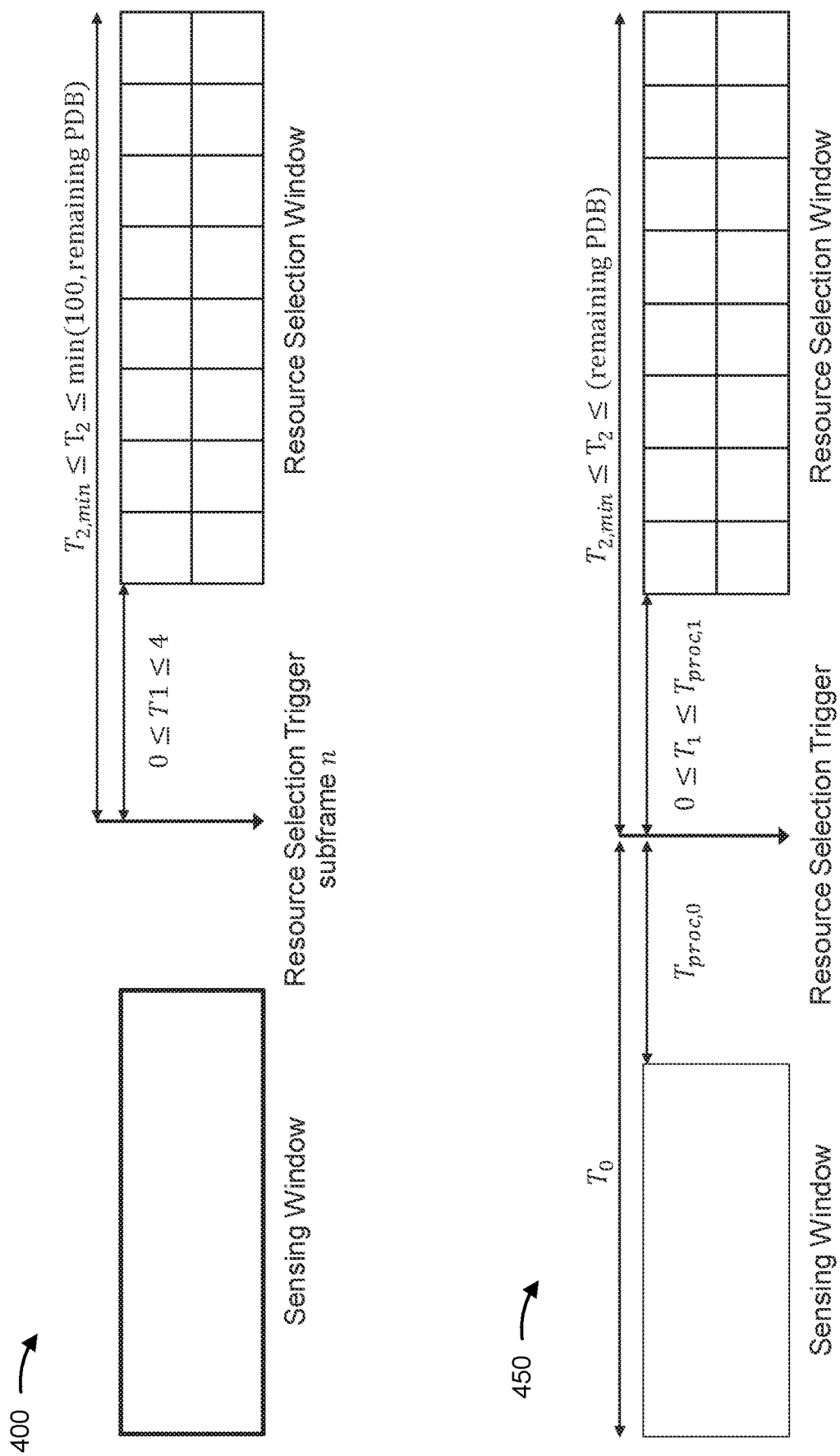
FIG. 4 is a diagram illustrating an example associated with sensing and resource selection, in accordance with the present disclosure.

FIG. 4 is a diagram illustrating an example 400 of sensing and resource selection, in accordance with the present disclosure.

As shown in FIG. 4, a UE may use a sensing procedure to select resources for sidelink communication, such as the sidelink communications associated with DRX described above in connection with FIG. 3. For example, a UE configured for communication in an LTE network may perform the sensing procedure of example 400. As another example, a UE configured for communication in a 5G/NR network may perform the sensing procedure of example 450.

As shown in FIG. 4, a UE may perform a sensing procedure in a sensing window. As just two examples, the sensing window may be 100 milliseconds (ms) (e.g., for aperiodic resource reservation, such as aperiodic reservation in one or more slots of up to 32 logical slots in the future) or 1100 ms (e.g., for periodic resource reservation). In some cases, a UE configured for communication in a 5G/NR network may use a sensing procedure for aperiodic or periodic resource reservation. In some cases, a UE configured for communication in an LTE network may use a sensing procedure for only periodic resource reservation (e.g., which may be limited to a maximum quantity of retransmissions (e.g., two retransmissions) per transport block).

According to the sensing procedure, the UE may decode control messages relating to resource reservations of other UEs, as well as perform measurements (e.g., RSRP measurements, RSSI measurements, RSRQ measurements, and/or the like) associated with one or more sidelink channels. For example, UEs may transmit reservation information (e.g., in SCI) that indicates a resource reservation for a current slot (e.g., the slot in which the reservation information is transmitted) and for one or more (e.g., up to two) future slots. A resource allocation associated with a resource reservation may be one or more sub-channels in a frequency domain and one slot in a time domain. In some cases, a resource reservation may be aperiodic. In other cases, a resource reservation may be periodic. In periodic resource reservation, a UE may signal (e.g., in the reservation information in SCI) a period for the resource reservation (e.g., a value between 0 ms and 1000 ms). Periodic resource reservation may be disabled by configuration for some UEs.

As shown in FIG. 4, the UE may determine to select resources for a sidelink communication based at least in part on a resource selection trigger. For example, resource selection may be triggered when the UE has a packet that is to be transmitted. Based at least in part on the resource selection trigger, the UE may determine one or more resources that are available for selection in a resource selection window. That is, the UE may determine the one or more available resources based at least in part on the sensing procedure performed by the UE. For example, the sensing procedure may provide an indication of resources in the resource selection window that are occupied and/or resources in the resource selection window associated with high interference.

In some cases, if a resource selection trigger occurs in a subframe n, the resource selection window is from $n+T_1$ to $n+T_2$. In this case, $T_1$ may be less than or equal to 4 (e.g., for LTE) or may be less than a processing time ($T_{proc,1}$) (e.g., for 5G/NR). Moreover, $T_2$ may be greater than or equal to $T_{2,min}$, which may be a value configured for the UE based at least in part on a priority of the UE, and less than or equal to 100 or a remaining packet delay budget (PDB) of the UE (e.g., for LTE, $T_2$ may be less than or equal to a minimum of 100 or a remaining PDB, and for NR, $T_2$ may be less than or equal to a remaining PDB). Thus, the UE may look backward at resource usage in a sensing window to select resources in a resource selection window that occurs in the future.

In some cases, an extent to which a UE performs a sensing procedure may be based at least in part on a sensing mode used by the UE (e.g., according to a sensing mode configuration). For a full-sensing mode, the UE may perform a sensing procedure for all slots associated with a sensing window. For a partial-sensing mode, the UE may perform a sensing procedure for a subset of resources (e.g., slots, subframes, and/or the like), of a sensing window. A sensing procedure in a full-sensing mode or a partial-sensing mode may be performed by the UE over an entire sidelink bandwidth, which may be computationally intensive and consume significant processing resources of the UE. Although a sensing procedure in a partial-sensing mode may conserve some processing resources of the UE, a sensing procedure in a partial-sensing mode may not be suitable for aperiodic resource reservation.

For a no-sensing mode, the UE may not perform a sensing procedure in a sensing window, and may select (e.g., at random) resources in a resource selection window. Accordingly, the UE may determine that all resources in the resource selection window are candidates for selection when using a no-sensing mode, and the UE may report a set of candidates to higher layers for use. UEs operating in a no-sensing mode may experience a high rate of resource collision.

As indicated above, FIG. 4 is provided as an example. Other examples may differ from what is described with respect to FIG. 4.

As noted above, DRX may conserve UE battery resources by limiting communication resources used while performing DRX operations. Due to communication resource limitations during DRX, using DRX may limit or prevent sensing, which may reduce communications quality due to a lack of adequate sensing and resource selection, which may lead to high resource collision. For example, components of the UE that are used for sensing (such as a receive chain) are typically deactivated during a DRX inactive time, which means sensing may be impossible or inefficient during DRX inactive times.

Some aspects described herein provide techniques and apparatuses for signal monitoring (e.g., sensing) during DRX. In some aspects, a UE may receive, from a transmit UE, a sidelink WUS that indicates the UE is to monitor a first subset of resources for SCI from the transmit UE, and the first subset of resources may be associated with an active monitoring state of a DRX cycle. The UE may monitor for the SCI during the active monitoring state and may also perform sensing, using a second subset of resources associated with the active monitoring state, for signals associated with a sidelink control signal associated with at least one other UE. As a result, the UE is able to perform DRX to conserve battery life and communications resources while also using the active monitoring state of the DRX cycle to perform sensing for signals associated with other UEs. The sensing may enable better resource selection for future communications, which may lead to higher quality communications, and performing the sensing during the active monitoring state of the DRX cycle may preserve the battery life saving benefits of DRX due to the sensing not using additional UE resources outside of the active monitoring state of the DRX cycle.

Figure 5:
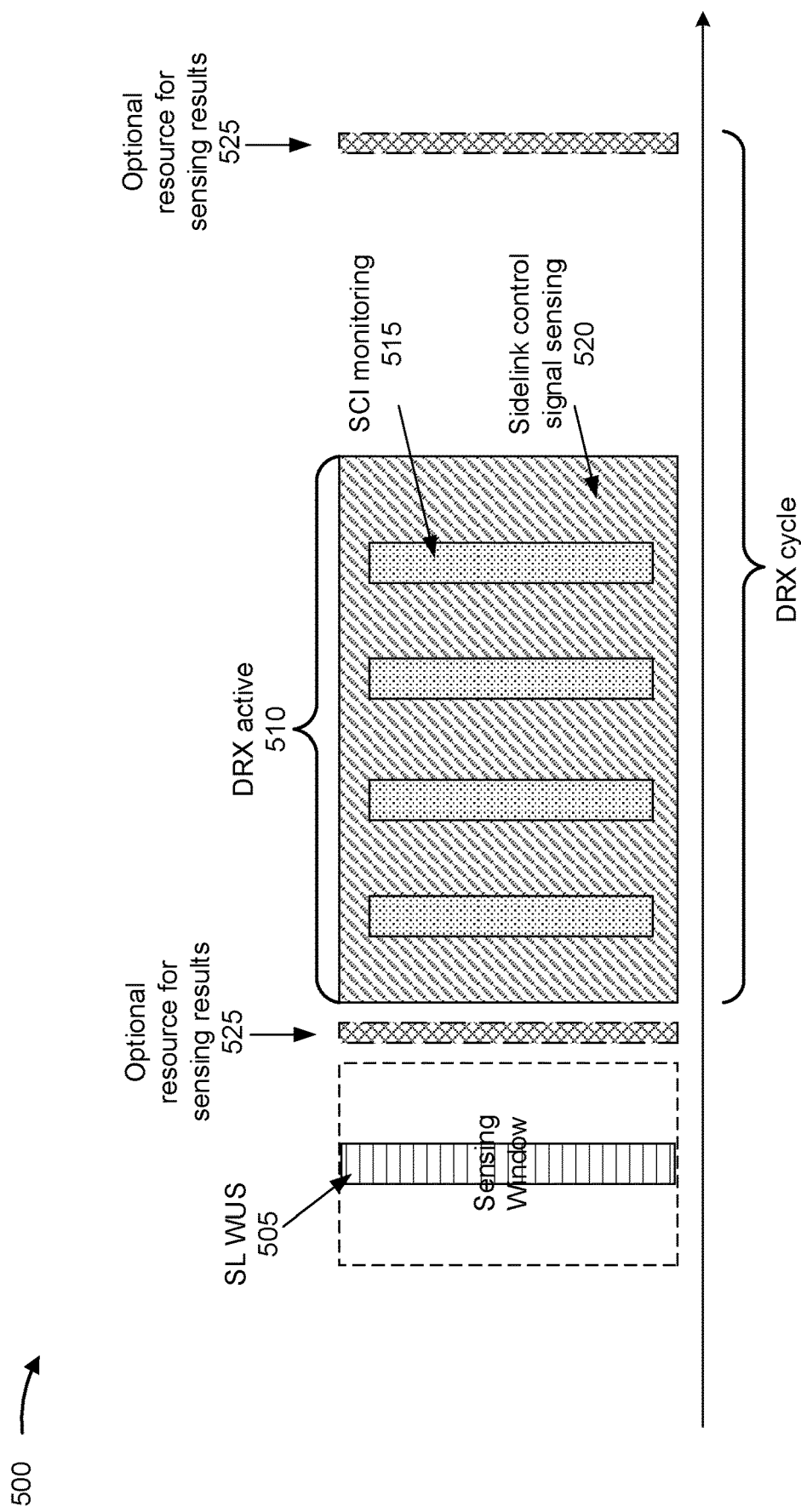
FIG. 5 is a diagram illustrating an example associated with signal monitoring during discontinuous reception, in accordance with the present disclosure.

FIG. 5 is a diagram illustrating an example 500 of signal monitoring during discontinuous reception, in accordance with the present disclosure. As shown in FIG. 5, a UE (e.g., UE 120) may monitor for sidelink control signals during an active monitoring state of a DRX cycle.

As shown by reference number 505, the UE may receive information indicating that the UE is to monitor a first subset of resources, of a set of resources (e.g., time, frequency, and/or spatial resources), for SCI from a transmit UE. The set of resources may be associated with an active monitoring state of a DRX cycle.

In some aspects, the information received by the UE may be a sidelink WUS transmitted to the UE by a transmit UE (e.g., another UE 120) via a sidelink communication. In some aspects, the information may be received via radio resource control (RRC) signaling, medium access control (MAC) signaling, control information, or the like.

In some aspects, the information identifies the first subset of resources. For example, the sidelink WUS (and/or RRC) may indicate which resources, during the active DRX state, the UE should use to monitor for SCI transmitted by the sidelink transmit UE. The information may, for example, identify one or more beams, slots, or frequencies that should be monitored for the SCI. In some aspects, the information identifies at least one beam via which the UE is to monitor for the SCI.

In some aspects, the information indicates that a result of the sensing is to be transmitted to the transmit UE. For example, the information may indicate that the UE, after sensing for sidelink control signals of other UEs, is to transmit a result of the sensing to the transmit UE (e.g., to enable the transmit UE to select resources for future sidelink transmissions).

In some aspects, the second subset of resources may include all resources, of the set of resources, which are not in the first subset of resources. For example, any portion of the active DRX state that is not to be used for monitoring the SCI can be used for sensing, enabling the UE to use the entire active DRX state to monitor for the SCI and/or to sense for the sidelink control signal(s) of other UEs.

As shown by reference number 510, the UE may enter the active DRX state. For example, as noted above, the DRX cycle may include an inactive DRX state (e.g., for a DRX off duration), during which the UE operates in a manner designed to reduce battery consumption by limiting various communication features, including disabling signal sensing, monitoring, and/or transmission, among other examples. The UE may switch to the active DRX state (e.g., for a DRX on duration) to perform the various communication features (e.g., signal sensing, monitoring, and/or transmission, among other examples) before switching back to the inactive DRX state.

In some aspects, the DRX cycle, during which the UE performs the SCI monitoring and sidelink control signal sensing, is a next DRX cycle after receiving the information. For example, the UE may not enter the active DRX state, may not perform SCI monitoring, and/or may not perform sidelink control signal sensing, until the UE receives the information (e.g., in a sidelink WUS or via RRC signaling). In this case, the UE may receive the information in one DRX cycle and enter the active DRX state for the next DRX cycle.

While the example active DRX state is shown at the beginning of the DRX cycle and appears to have a duration greater than half of the DRX cycle, other example DRX cycles may include an active DRX state at a different point in the DRX cycle (e.g., in the middle or at the end of the DRX cycle, among other examples) and, in some aspects, the relative duration of the active DRX state may be shorter or longer than the depicted example.

As shown by reference number 515, the UE may monitor the first subset of resources (depicted by dotted pattern boxes in example 500) for the SCI. For example, as described above, the first subset of resources monitored by the UE may include time, frequency, and/or spatial resources identified by the information (e.g., sidelink WUS and/or RRC). In some aspects, the UE may monitor the first subset of resources using one or more first beams, and sense for the signals associated with the sidelink control signal using one or more second beams. This may enable the UE to monitor for the SCI and sense for signals associated with the sidelink control signal at the same time.

As shown by reference number 520, the UE may sense, using a second subset of resources (depicted by angled line pattern boxes in example 500) of the set of resources, for signals associated with sidelink control signals associated with at least one other UE. For example, as described above, the second subset of resources monitored by the UE may include time, frequency, and/or spatial resources that are not used by the UE for monitoring for the SCI.

In some aspects, when sensing for the signals associated with the sidelink control signals, the UE may sense for transmission announcement signals, reception announcement signals, and/or sidelink control information associated with at least one other UE. Transmit transmission announcement signals reserve resources in the future for sidelink transmission; reception announcement signals reserve resources in the future for sidelink reception. Generally, any UE that receives a transmission announcement signal may avoid receiving in the same future resources that are reserved by the transmission announcement signal; any UE that receives a reception announcement signal may avoid transmitting in the same future resources that are reserved by the reception announcement signal. In some aspects, the UE may sense, using another set of resources adjacent to the set of resources (e.g., in a time domain, such as before and/or after the active DRX state), for the signals associated with the sidelink control signals. For example, example 500 depicts a sensing window that may be used to perform sensing prior to the active DRX state. The sensing window may enable the UE to sense for the signals associated with the sidelink control signals using additional or alternative resources to those in the second subset of resources. In addition, in some aspects, the UE may only activate and deactivate various components used for sensing once per DRX cycle, in which case, using a sensing window adjacent to the set of resources may facilitate saving UE battery life. In some aspects, the other set of resources may not be adjacent to the set of resources. For example, the sensing window depicted in example 500 may occur at a different point in time during the DRX cycle.

As shown by reference number 525, in some aspects, the UE may transmit, prior to or after the active monitoring state (e.g., the active DRX state, or DRX on duration), a result of the sensing using the other set of resources adjacent to the set of resources. For example, in a situation where the UE performs sensing in the sensing window depicted in example 500, the UE may transmit a result of the sensing prior to the active DRX state. In some aspects, the UE may transmit a result of the sensing using the second subset of resources (e.g., the resources used to sense for the signals associated with the sidelink control signals).

In some aspects, the information received by the UE (e.g., the sidelink WUS and/or RRC) may indicate that a result of the sensing is to be transmitted to the transmit UE (e.g., the UE transmitting the information to the UE). In some aspects, the result may be transmitted via a report that contains information regarding which resources will be used by other UEs, an estimate of a percentage of channels that are being used by other UEs (e.g., a channel busy ratio (CBR)), and/or the like. The report may enable, for example, the recipient of the report (e.g., the transmit UE) to select resources for future communications with the UE.

In this way, the UE may perform DRX to conserve battery life and communications resources while also using the active monitoring state of the DRX cycle to perform sensing for signals associated with other UEs. The sensing may enable better resource selection for future communications, which may lead to higher quality communications, and performing the sensing during the active monitoring state of the DRX cycle may preserve the battery life saving benefits of DRX due to the sensing not using additional UE resources outside of the active monitoring state of the DRX cycle.

As indicated above, FIG. 5 is provided as an example. Other examples may differ from what is described with respect to FIG. 5.

Figure 6:
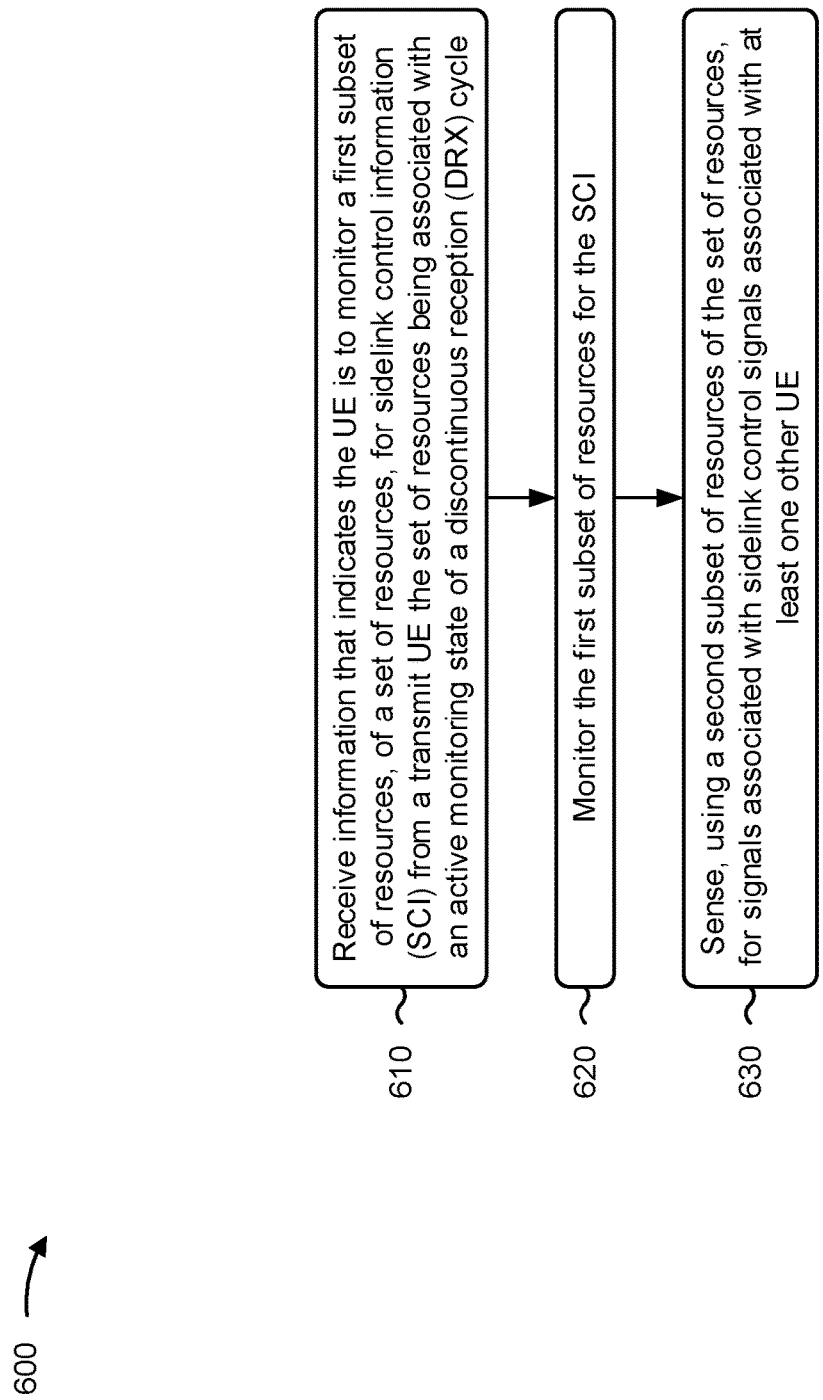
FIG. 6 is a diagram illustrating an example process associated with signal monitoring during discontinuous reception, in accordance with the present disclosure.

FIG. 6 is a diagram illustrating an example process 600 performed, for example, by a UE, in accordance with the present disclosure. Example process 600 is an example where the UE (e.g., UE 120) performs operations associated with signal monitoring during discontinuous reception.

As shown in FIG. 6, in some aspects, process 600 may include receiving information that indicates the UE is to monitor a first subset of resources, of a set of resources, for SCI from a transmit UE, the set of resources being associated with an active monitoring state of a DRX cycle (block 610). For example, the UE (e.g., using reception component 702, depicted in FIG. 7) may receive information that indicates the UE is to monitor a first subset of resources, of a set of resources, for SCI from a transmit UE, the set of resources being associated with an active monitoring state of a DRX cycle, as described above.

As further shown in FIG. 6, in some aspects, process 600 may include monitoring the first subset of resources for the SCI (block 620). For example, the UE (e.g., using monitoring component 708, depicted in FIG. 7) may monitor the first subset of resources for the SCI, as described above.

As further shown in FIG. 6, in some aspects, process 600 may include sensing, using a second subset of resources of the set of resources, for signals associated with sidelink control signals associated with at least one other UE (block 630). For example, the UE (e.g., using sensing component 710, depicted in FIG. 7) may sense, using a second subset of resources of the set of resources, for signals associated with sidelink control signals associated with at least one other UE, as described above.

Process 600 may include additional aspects, such as any single aspect or any combination of aspects described below and/or in connection with one or more other processes described elsewhere herein.

In a first aspect, the information identifies the first subset of resources.

In a second aspect, alone or in combination with the first aspect, the second subset of resources includes all resources, of the set of resources, which are not the first subset of resources.

In a third aspect, alone or in combination with one or more of the first and second aspects, the information identifies at least one beam via which the UE is to monitor for the SCI.

In a fourth aspect, alone or in combination with one or more of the first through third aspects, the information comprises a sidelink WUS, and wherein receiving the information comprises receiving the information from a transmit UE.

In a fifth aspect, alone or in combination with one or more of the first through fourth aspects, receiving the information comprises receiving the information via radio resource control.

In a sixth aspect, alone or in combination with one or more of the first through fifth aspects, sensing for the signals associated with the sidelink control signal comprises sensing for transmission announcement signals associated with the at least one other UE.

In a seventh aspect, alone or in combination with one or more of the first through sixth aspects, sensing for the signals associated with the sidelink control signal comprises sensing for reception announcement signals associated with the at least one other UE.

In an eighth aspect, alone or in combination with one or more of the first through seventh aspects, sensing for the signals associated with the sidelink control signal comprises sensing for SCI associated with the at least one other UE.

In a ninth aspect, alone or in combination with one or more of the first through eighth aspects, monitoring the first subset of resources for the SCI comprises monitoring the first subset of resources for the SCI using one or more first beams, and wherein sensing for the signals associated with the sidelink control signal comprises sensing for the signals associated with the sidelink control signal using one or more second beams.

In a tenth aspect, alone or in combination with one or more of the first through ninth aspects, the DRX cycle is a next DRX cycle after the UE receives the information.

In an eleventh aspect, alone or in combination with one or more of the first through tenth aspects, process 600 includes sensing, using another set of resources adjacent to the set of resources, for the signals associated with the sidelink control signal.

In a twelfth aspect, alone or in combination with one or more of the first through eleventh aspects, process 600 includes transmitting, prior to the active monitoring state, a result of the sensing using the other set of resources adjacent to the set of resources.

In a thirteenth aspect, alone or in combination with one or more of the first through twelfth aspects, process 600 includes transmitting, after the active monitoring state, a result of the sensing using the second subset of resources.

In a fourteenth aspect, alone or in combination with one or more of the first through thirteenth aspects, the information indicates that a result of the sensing is to be transmitted to the transmit UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
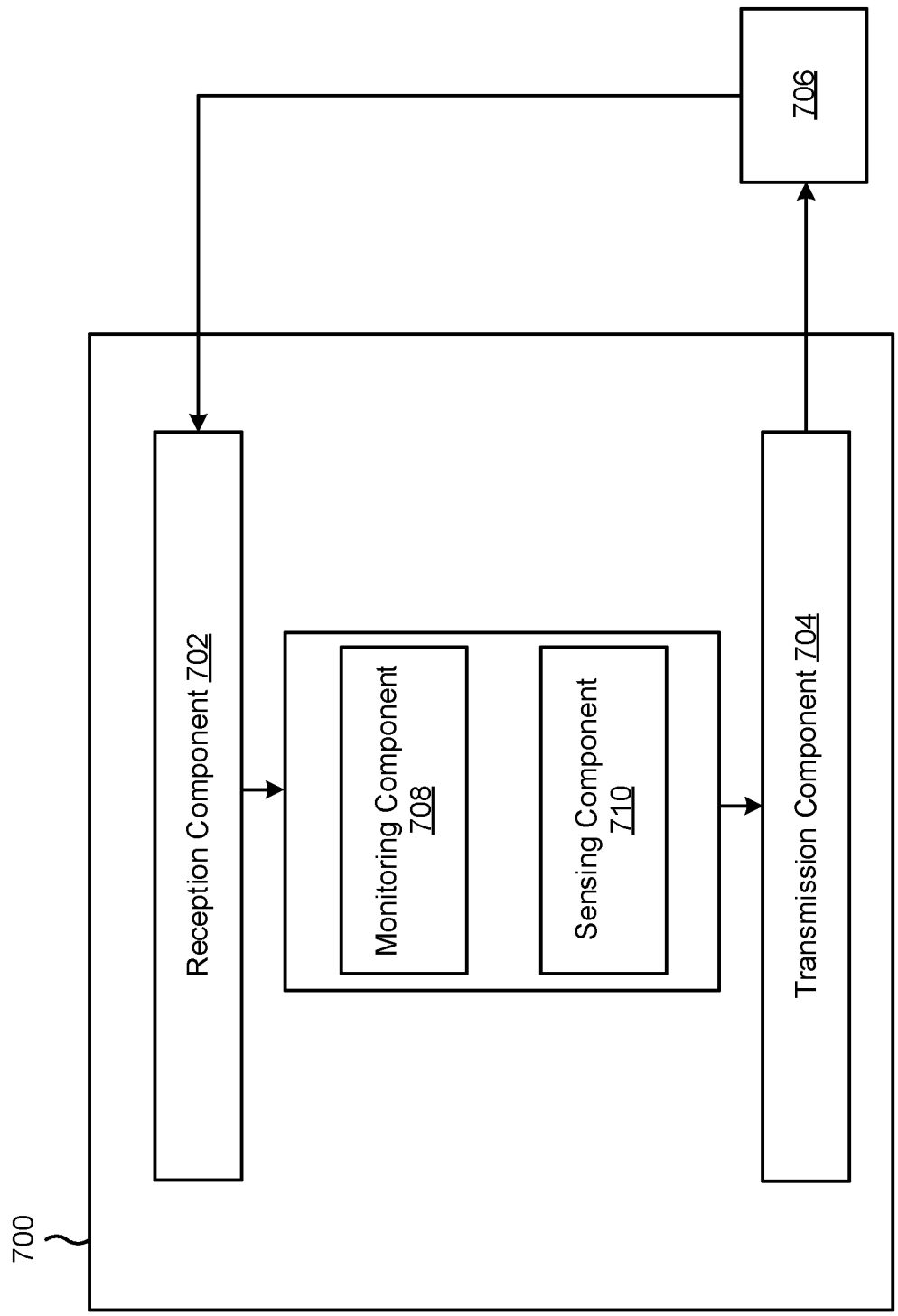
FIG. 7 is a block diagram of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a monitoring component 708, or a sensing component 710, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive information that indicates the UE is to monitor a first subset of resources, of a set of resources, for SCI from a transmit UE the set of resources being associated with an active monitoring state of a DRX cycle. The monitoring component 708 may monitor the first subset of resources for the SCI. The sensing component 710 may sense, using a second subset of resources of the set of resources, for signals associated with sidelink control signals associated with at least one other UE.

The sensing component 710 may sense, using another set of resources adjacent to the set of resources, for the signals associated with the sidelink control signal.

The transmission component 704 may transmit, prior to the active monitoring state, a result of the sensing using the other set of resources adjacent to the set of resources.

The transmission component 704 may transmit, after the active monitoring state, a result of the sensing using the second subset of resources.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving information that indicates the UE is to monitor a first subset of resources, of a set of resources, for sidelink control information (SCI) from a transmit UE, the set of resources being associated with an active monitoring state of a discontinuous reception (DRX) cycle; monitoring the first subset of resources for the SCI; and sensing, using a second subset of resources of the set of resources, for signals associated with sidelink control signals associated with at least one other UE.

Aspect 2: The method of Aspect 1, wherein the information identifies the first subset of resources.

Aspect 3: The method of Aspect 2, wherein the second subset of resources includes all resources, of the set of resources, which are not the first subset of resources.

Aspect 4: The method of any of Aspects 1-3, wherein the information identifies at least one beam via which the UE is to monitor for the SCI.

Aspect 5: The method of any of Aspects 1-4, wherein the information comprises a sidelink wake-up signal (WUS); and wherein receiving the information comprises: receiving the information from a transmit UE.

Aspect 6: The method of any of Aspects 1-4, wherein receiving the information comprises: receiving the information via radio resource control.

Aspect 7: The method of any of Aspects 1-6, wherein sensing for the signals associated with the sidelink control signal comprises: sensing for transmission announcement signals associated with the at least one other UE.

Aspect 8: The method of any of Aspects 1-7, wherein sensing for the signals associated with the sidelink control signal comprises: sensing for reception announcement signals associated with the at least one other UE.

Aspect 9: The method of any of Aspects 1-8, where sensing for the signals associated with the sidelink control signal comprises: sensing for sidelink control information (SCI) associated with the at least one other UE.

Aspect 10: The method of any of Aspects 1-9, wherein monitoring the first subset of resources for the SCI comprises: monitoring the first subset of resources for the SCI using one or more first beams; and wherein sensing for the signals associated with the sidelink control signal comprises:

sensing for the signals associated with the sidelink control signal using one or more second beams.

Aspect 11: The method of any of Aspects 1-10, wherein the DRX cycle is a next DRX cycle after the UE receives the information.

Aspect 12: The method of any of Aspects 1-11, further comprising: sensing, using another set of resources adjacent to the set of resources, for the signals associated with the sidelink control signal.

Aspect 13: The method of Aspect 12, further comprising: transmitting, prior to the active monitoring state, a result of the sensing using the other set of resources adjacent to the set of resources.

Aspect 14: The method of any of Aspects 1-12, further comprising: transmitting, after the active monitoring state, a result of the sensing using the second subset of resources.

Aspect 15: The method of any of Aspects 1-14, wherein the information indicates that a result of the sensing is to be transmitted to the transmit UE.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, during an inactive state of a discontinuous reception (DRX) cycle, information that indicates for the UE to switch from the inactive state to an active monitoring state of the DRX cycle and that the UE is to monitor a first subset of resources, of a set of resources, for sidelink control information (SCI) from a transmit UE, the set of resources being associated with the active monitoring state;
   monitoring, based at least in part on receiving the information during the inactive state, the first subset of resources for the SCI; and
   sensing, using a second subset of resources of the set of resources and based at least in part on receiving the information during the inactive state, for signals associated with sidelink control signals associated with at least one other UE.

2. The method of claim 1, wherein the information identifies the first subset of resources.

3. The method of claim 2, wherein the second subset of resources includes all resources, of the set of resources, which are not the first subset of resources.

4. The method of claim 1, wherein the information identifies at least one beam via which the UE is to monitor for the SCI.

5. The method of claim 1, wherein the information comprises a sidelink wake-up signal (WUS); and
wherein receiving the information comprises:
receiving the information from the transmit UE.

6. The method of claim 1, wherein receiving the information comprises:
receiving the information via radio resource control.

7. The method of claim 1, wherein sensing for the signals associated with the sidelink control signals comprises:
sensing for transmission announcement signals associated with the at least one other UE.

8. The method of claim 1, wherein sensing for the signals associated with the sidelink control signals comprises:
sensing for reception announcement signals associated with the at least one other UE.

9. The method of claim 1, where sensing for the signals associated with the sidelink control signals comprises:
sensing for SCI associated with the at least one other UE.

10. The method of claim 1, wherein monitoring the first subset of resources for the SCI comprises:
monitoring the first subset of resources for the SCI using one or more first beams; and
wherein sensing for the signals associated with the sidelink control signals comprises:
sensing for the signals associated with the sidelink control signals using one or more second beams.

11. The method of claim 1, wherein the DRX cycle is a next DRX cycle after the UE receives the information.

12. The method of claim 1, further comprising:
sensing, using another set of resources adjacent to the set of resources, for the signals associated with the sidelink control signals.

13. The method of claim 12, further comprising:
transmitting, prior to the active monitoring state, a result of the sensing using the other set of resources adjacent to the set of resources.

14. The method of claim 1, further comprising:
transmitting, after the active monitoring state, a result of the sensing using the second subset of resources.

15. The method of claim 1, wherein the information indicates that a result of the sensing is to be transmitted to the transmit UE.

16. A user equipment (UE) for wireless communication, comprising:
a memory; and
one or more processors, coupled to the memory, configured to:
receive, during an inactive state of a discontinuous reception (DRX) cycle, information that indicates for the UE to switch from the inactive state to an active monitoring state of the DRX cycle and that the UE is to monitor a first subset of resources, of a set of resources, for sidelink control information (SCI) from a transmit UE, the set of resources being associated with the active monitoring state;
monitor, based at least in part on receiving the information during the inactive state, the first subset of resources for the SCI; and
sense, using a second subset of resources of the set of resources and based at least in part on receiving the information during the inactive state, for signals associated with sidelink control signals associated with at least one other UE.

17. The UE of claim 16, wherein the information identifies the first subset of resources.

18. The UE of claim 17, wherein the second subset of resources includes all resources, of the set of resources, which are not the first subset of resources.

19. The UE of claim 16, wherein the information comprises a sidelink wake-up signal (WUS); and
wherein the one or more processors, to receive the information, are configured to:
receive the information from the transmit UE.

20. The UE of claim 16, wherein the one or more processors, to receive the information, are configured to:
receive the information via radio resource control.

21. The UE of claim 16, wherein the one or more processors, to monitor the first subset of resources for the SCI, are configured to:
monitor the first subset of resources for the SCI using one or more first beams; and
wherein the one or more processors, to sense for the signals associated with the sidelink control signals, are configured to:
sense for the signals associated with the sidelink control signals using one or more second beams.

22. The UE of claim 16, wherein the DRX cycle is a next DRX cycle after the UE receives the information.

23. The UE of claim 16, wherein the one or more processors are further configured to:
transmit, after the active monitoring state, a result of the sensing using the second subset of resources.

24. A non-transitory computer-readable medium storing a set of instructions for wireless communication, the set of instructions comprising:
one or more instructions that, when executed by one or more processors of a user equipment (UE), cause the UE to:
receive, during an inactive state of a discontinuous reception (DRX) cycle, information that indicates for the UE to switch from the inactive state to an active monitoring state of the DRX cycle and that the UE is to monitor a first subset of resources, of a set of resources, for sidelink control information (SCI) from a transmit UE, the set of resources being associated with the active monitoring state;
monitor, based at least in part on receiving the information during the inactive state, the first subset of resources for the SCI; and
sense, using a second subset of resources of the set of resources and based at least in part on receiving the information during the inactive state, for signals associated with sidelink control signals associated with at least one other UE.

25. The non-transitory computer-readable medium of claim 24, wherein the information identifies the first subset of resources.

26. The non-transitory computer-readable medium of claim 25, wherein the second subset of resources includes all resources, of the set of resources, which are not the first subset of resources.

27. The non-transitory computer-readable medium of claim 24, wherein the one or more instructions further cause the UE to monitor for the SCI.

28. An apparatus for wireless communication, comprising:
means for receiving, during an inactive state of a discontinuous reception (DRX) cycle, information that indicates for the apparatus to switch from the inactive state to an active monitoring state of the DRX cycle and that the apparatus is to monitor a first subset of resources, of a set of resources, for sidelink control information (SCI) from a transmit user equipment (UE), the set of resources being associated with the active monitoring state;

means for monitoring, based at least in part on receiving the information during the inactive state, the first subset of resources for the SCI; and means for sensing, using a second subset of resources of the set of resources and based at least in part on receiving the information during the inactive state, for signals associated with sidelink control signals associated with at least one other UE.

29. The apparatus of claim 28, wherein the information identifies the first subset of resources.

30. The apparatus of claim 29, wherein the second subset of resources includes all resources, of the set of resources, which are not the first subset of resources.

* * * * *